(12) United States Patent
Gopalan et al.

(10) Patent No.: US 11,579,923 B2
(45) Date of Patent: Feb. 14, 2023

(54) TASK DELEGATION AND COOPERATION FOR AUTOMATED ASSISTANTS

(71) Applicant: AT&T Intellectual Property I, L.P., Atlanta, GA (US)

(72) Inventors: Raghuraman Gopalan, Dublin, CA (US); Lee Begeja, Gillette, NJ (US); David Crawford Gibbon, Lincroft, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/658,758

(22) Filed: Apr. 11, 2022

(65) Prior Publication Data
US 2022/0237027 A1 Jul. 28, 2022

Related U.S. Application Data

(63) Continuation of application No. 17/017,210, filed on Sep. 10, 2020, now Pat. No. 11,321,119, which is a
(Continued)

(51) Int. Cl.
*G06F 15/16* (2006.01)
*G06F 9/48* (2006.01)
(Continued)

(52) U.S. Cl.
CPC .......... *G06F 9/4862* (2013.01); *G06F 9/5038* (2013.01); *G06F 9/542* (2013.01); *H04L 12/2818* (2013.01); *H04W 4/203* (2013.01)

(58) Field of Classification Search
CPC ..... H04L 51/04; H04L 51/216; G06F 3/0482; G06Q 10/107; H04M 2215/81
(Continued)

(56) References Cited

U.S. PATENT DOCUMENTS 6,334,103 B1    12/2001  Surace et al.
7,565,433 B1 *   7/2009  Lamport .............. G06Q 10/107
                                                        709/227
(Continued)

FOREIGN PATENT DOCUMENTS

EP      1 197 898 A2    2/2004
WO    2010/009869 A2    1/2010
(Continued)

OTHER PUBLICATIONS

Final Office Action received for U.S. Appl. No. 16/029,523 dated Nov. 20, 2020, 32 pages.
(Continued)

*Primary Examiner* — Anthony Mejia
(74) *Attorney, Agent, or Firm* — Amin, Turocy & Watson, LLP

(57) ABSTRACT

Task delegation and cooperation for automated assistants is presented. A method comprises receiving, at a centralized support center that is in contact with a plurality of automated assistants including a first automated assistant and a second automated assistant, a request to perform a task on behalf of an individual, formulating, at the centralized support center, the task as a plurality of sub-tasks including a first sub-task and a second sub-task, delegating, at the centralized support center, the first sub-task to the first automated assistant, based on a determination at the centralized support center that the first automated assistant is capable of performing the first sub-task, and delegating, at the centralized support center, the second sub-task to the second automated assistant, based on a determination at the centralized support center that the second automated assistant is capable of performing the second sub-task.

20 Claims, 4 Drawing Sheets

Related U.S. Application Data continuation of application No. 16/129,267, filed on Sep. 12, 2018, now Pat. No. 10,802,872.

(51) Int. Cl.
*G06F 9/50* (2006.01)
*H04L 12/28* (2006.01)
*H04W 4/20* (2018.01)
*G06F 9/54* (2006.01)

(58) Field of Classification Search
USPC .......................................................... 709/206
See application file for complete search history.

(56) References Cited

U.S. PATENT DOCUMENTS

| | | | |
|---|---|---|---|
| 7,711,825 B2* | 5/2010 | Lamport | G06F 11/182 709/227 |
| 7,797,261 B2 | 9/2010 | Yang | |
| 7,856,502 B2* | 12/2010 | Lamport | G06F 11/187 709/227 |
| 7,944,448 B2 | 5/2011 | Iwamura et al. | |
| 8,347,297 B2* | 1/2013 | Mateo | H04L 67/1012 718/100 |
| 8,909,693 B2 | 12/2014 | Frissora et al. | |
| 8,930,815 B2 | 1/2015 | Moore | |
| 8,966,568 B2 | 2/2015 | Abendroth et al. | |
| 9,172,747 B2 | 10/2015 | Walters et al. | |
| 9,276,802 B2 | 3/2016 | Lynch et al. | |
| 9,324,057 B2 | 4/2016 | Krishnaswamy et al. | |
| 9,386,152 B2 | 7/2016 | Riahi et al. | |
| 9,390,243 B2 | 7/2016 | Dhillon et al. | |
| 9,471,638 B2 | 10/2016 | Roytman et al. | |
| 9,479,931 B2 | 10/2016 | Ortiz et al. | |
| 9,501,743 B2 | 11/2016 | Tur et al. | |
| 9,531,695 B2 | 12/2016 | Koppolu et al. | |
| 9,536,065 B2 | 1/2017 | Bouse et al. | |
| 9,762,734 B1 | 9/2017 | McCarthy-Howe et al. | |
| 9,786,299 B2 | 10/2017 | Un et al. | |
| 9,787,841 B2 | 10/2017 | Chishti et al. | |
| 9,805,718 B2 | 10/2017 | Ayan et al. | |
| 9,812,151 B1 | 11/2017 | Amini et al. | |
| 9,817,872 B2 | 11/2017 | Pamu et al. | |
| 9,823,811 B2 | 11/2017 | Brown et al. | |
| 9,830,044 B2 | 11/2017 | Brown et al. | |
| 9,836,177 B2 | 12/2017 | Brown et al. | |
| 9,881,614 B1 | 1/2018 | Thirukovalluru et al. | |
| 9,928,106 B2 | 3/2018 | Hosabettu et al. | |
| 9,934,493 B2 | 4/2018 | Castinado et al. | |
| 9,973,457 B2 | 5/2018 | Cauchois et al. | |
| 10,009,666 B1 | 6/2018 | van Scheltinga et al. | |
| 10,032,137 B2 | 7/2018 | Skiba et al. | |
| 10,043,516 B2 | 8/2018 | Saddler et al. | |
| 10,069,915 B2* | 9/2018 | Dhuse | G06F 3/067 |
| 10,276,185 B1 | 4/2019 | Ma et al. | |
| 10,388,272 B1 | 8/2019 | Thomson et al. | |
| 10,395,659 B2 | 8/2019 | Piercy et al. | |
| 10,204,627 B2 | 12/2019 | Nitz et al. | |
| 10,649,824 B1* | 5/2020 | Tan | G06F 9/542 |
| 2002/0035592 A1* | 3/2002 | Wu | G06Q 10/10 709/202 |
| 2005/0064374 A1 | 3/2005 | Spector | |
| 2005/0125793 A1* | 6/2005 | Aguilar, Jr. | G06F 9/4843 718/100 |
| 2007/0035764 A1 | 2/2007 | Aldrich et al. | |
| 2008/0096533 A1 | 4/2008 | Manfredi et al. | |
| 2008/0159547 A1 | 7/2008 | Schuler et al. | |
| 2008/0269958 A1 | 10/2008 | Filev et al. | |
| 2009/0132371 A1 | 5/2009 | Strietzel et al. | |
| 2009/0209341 A1 | 8/2009 | Okada | |
| 2010/0082515 A1 | 4/2010 | Relyea et al. | |
| 2010/0100907 A1 | 4/2010 | Chang et al. | |
| 2010/0223297 A1* | 9/2010 | Li | G06F 9/5027 707/802 |
| 2011/0064388 A1 | 3/2011 | Brown et al. | |
| 2011/0106674 A1 | 5/2011 | Perlman | |
| 2011/0138299 A1 | 6/2011 | Pugsley et al. | |
| 2011/0172873 A1 | 7/2011 | Szwabowski et al. | |
| 2011/0193726 A1 | 8/2011 | Szwabowski et al. | |
| 2012/0084781 A1* | 4/2012 | Isaka | G06F 9/5038 718/100 |
| 2012/0137367 A1 | 5/2012 | Dupont et al. | |
| 2012/0221504 A1 | 8/2012 | Rosini et al. | |
| 2012/0254280 A1* | 10/2012 | Parker, II | G06F 9/5044 709/201 |
| 2013/0006874 A1 | 1/2013 | Klemm | |
| 2013/0081032 A1* | 3/2013 | Levien | G06Q 10/06311 718/102 |
| 2013/0152092 A1 | 6/2013 | Yadgar | |
| 2013/0219406 A1* | 8/2013 | Hatabe | G06F 9/4881 718/105 |
| 2013/0305169 A1 | 11/2013 | Gold | |
| 2013/0332985 A1 | 12/2013 | Sastry et al. | |
| 2014/0053223 A1 | 2/2014 | Vorobyov et al. | |
| 2014/0244712 A1 | 4/2014 | Walters et al. | |
| 2014/0125678 A1 | 5/2014 | Wang et al. | |
| 2014/0160149 A1 | 6/2014 | Blackstock et al. | |
| 2014/0245140 A1 | 8/2014 | Brown et al. | |
| 2014/0310001 A1 | 10/2014 | Kalns et al. | |
| 2014/0365407 A1 | 12/2014 | Brown et al. | |
| 2015/0071450 A1 | 3/2015 | Boyden et al. | |
| 2015/0081361 A1* | 3/2015 | Lee | G06Q 10/06311 705/7.13 |
| 2015/0084838 A1 | 3/2015 | Chang et al. | |
| 2015/0088514 A1 | 3/2015 | Typrin | |
| 2015/0169336 A1 | 6/2015 | Harper et al. | |
| 2015/0169383 A1* | 6/2015 | van den Berghe | G06F 11/3409 718/104 |
| 2015/0185996 A1 | 7/2015 | Brown et al. | |
| 2015/0186155 A1 | 7/2015 | Brown et al. | |
| 2015/0213800 A1 | 7/2015 | Krishnan et al. | |
| 2015/0234377 A1* | 8/2015 | Mizikovsky | G06F 30/13 700/98 |
| 2016/0004564 A1* | 1/2016 | Park | G06F 9/4868 718/104 |
| 2016/0086500 A1 | 3/2016 | Kaleal, III | |
| 2016/0094654 A1* | 3/2016 | Raman | G06F 3/04842 715/733 |
| 2016/0099892 A1 | 4/2016 | Palakovich et al. | |
| 2016/0119478 A1 | 4/2016 | Sharpe et al. | |
| 2016/0225187 A1 | 8/2016 | Knipp et al. | |
| 2016/0294952 A1 | 10/2016 | Bodell et al. | |
| 2017/0017522 A1* | 1/2017 | Daga | G06F 9/46 |
| 2017/0031735 A1* | 2/2017 | Levien | G06F 21/554 |
| 2017/0068423 A1* | 3/2017 | Napolitano | G06F 16/489 |
| 2017/0078403 A1 | 3/2017 | Obata et al. | |
| 2017/0124645 A1 | 5/2017 | Kortina et al. | |
| 2017/0154637 A1 | 6/2017 | Chu et al. | |
| 2017/0160813 A1 | 6/2017 | Divakaran et al. | |
| 2017/0163750 A1 | 6/2017 | Sullivan et al. | |
| 2017/0206095 A1 | 7/2017 | Gibbs et al. | |
| 2017/0249104 A1 | 8/2017 | Moon et al. | |
| 2017/0255496 A1* | 9/2017 | Deng | G06F 9/4881 |
| 2017/0269972 A1 | 9/2017 | Hosabettu et al. | |
| 2017/0269975 A1 | 9/2017 | Wood et al. | |
| 2017/0270431 A1 | 9/2017 | Hosabettu et al. | |
| 2017/0289069 A1 | 10/2017 | Plumb et al. | |
| 2017/0300648 A1 | 10/2017 | Charlap | |
| 2017/0344893 A1 | 11/2017 | Sengupta et al. | |
| 2017/0357478 A1 | 12/2017 | Piersol et al. | |
| 2018/0018373 A1 | 1/2018 | Yazdian et al. | |
| 2018/0047029 A1 | 2/2018 | Saso et al. | |
| 2018/0053119 A1 | 2/2018 | Zeng et al. | |
| 2018/0054523 A1 | 2/2018 | Zhang et al. | |
| 2018/0082683 A1 | 3/2018 | Chen et al. | |
| 2018/0095512 A1 | 4/2018 | Artstain et al. | |
| 2018/0095624 A1 | 4/2018 | Osman et al. | |
| 2018/0107930 A1 | 4/2018 | Aggarwal et al. | |
| 2018/0157535 A1* | 6/2018 | Dushok | G06F 11/3433 |
| 2018/0191862 A1 | 7/2018 | Encarnacion et al. | |
| 2018/0197542 A1 | 7/2018 | Horling et al. | |
| 2018/0203847 A1 | 7/2018 | Akkiraju et al. | |

(56) References Cited

U.S. PATENT DOCUMENTS

| | | | |
|---|---|---|---|
| 2018/0211058 A1 | 7/2018 | Aunger et al. | |
| 2018/0232571 A1 | 8/2018 | Bathiche et al. | |
| 2018/0286395 A1 | 10/2018 | Li et al. | |
| 2018/0307542 A1 | 10/2018 | Kawakami et al. | |
| 2018/0314689 A1 | 11/2018 | Wang et al. | |
| 2018/0335903 A1 | 11/2018 | Coffman et al. | |
| 2018/0338038 A1 | 11/2018 | Ly et al. | |
| 2018/0373547 A1 | 12/2018 | Dawes | |
| 2018/0375807 A1 | 12/2018 | Krans et al. | |
| 2019/0073660 A1 | 3/2019 | Aung et al. | |
| 2019/0074987 A1 | 3/2019 | Wiener et al. | |
| 2019/0187787 A1 | 6/2019 | White et al. | |
| 2019/0188756 A1 | 6/2019 | Bradley et al. | |
| 2019/0304213 A1 | 10/2019 | Chen et al. | |
| 2019/0371315 A1* | 12/2019 | Ewen | G10L 15/22 |
| 2019/0391716 A1 | 12/2019 | Badr et al. | |
| 2020/0013423 A1 | 1/2020 | Benway et al. | |
| 2020/0073707 A1* | 3/2020 | Fatemi | G06F 9/505 |
| 2020/0098358 A1 | 3/2020 | Rakshit et al. | |

FOREIGN PATENT DOCUMENTS

| | | | |
|---|---|---|---|
| WO | 2020/009591 A1 | 1/2020 | |
| WO | WO-2020009591 A1 * | 1/2020 | ........... G06F 9/5027 |

OTHER PUBLICATIONS

Non-Final Office Action received for U.S. Appl. No. 16/029,523 dated Jun. 15, 2020, 73 pages.

Alam, et al. Predicting personality traits using multimodal information, Proceedings of the 2014 ACM Multi Media on Workshop on Computational Personality Recognition. ACM, 2014, 4 pages.

Siddique, et al. Zara returns: Improved personality induction and adaptation by an empathetic virtual agent, Proceedings of ACL 2017, System Demonstrations (2017): pp. 121-126.

Silva-Coira, et al. Intelligent Virtual Assistant for Gamified Environments, PACIS. 2016. 9 pages.

Ivanovic, et al. Emotional agents-state of the art and applications, Computer Science and Information Systems 12.4 (2015): pp. 1121-1148.

Feidakis, et al.. A Dual-Modal System that Evaluates User's Emotions in Virtual Learning Environments and Responds Affectively, J. UCS 19.11 (2013): pp. 1638-1660.

Gold, Hannah. "Sophia the Robot Would Like to Have a Child Named 'Sophia'" [https://jezebel.com/sophia-the-robot-would-like-to-have-a-child-named- sophi-1820821870] Nov. 28, 2017, 3 pages.

Stone, Zara. "Everything You Need To Know About Sophia, The World's First Robot Citizen" [https://www.forbes.com/sites/zarastone/2017/11/07/everything-you-need-to-know-about-sophia-the-worlds-first-robot-citizen/#158f4eeb46fa], Nov. 7, 2017, 8 pages.

Kemeny, Richard. "Anti-Swearing AI Takes the Edge Off Abuse on Reddit and Twitter New Scientist" [https://www.newscientist.com/article/2170650-anti-swearing-ai-takes-the-edge-off-abuse-on-reddit-and-twitter/] Jun. 4, 2018, 3 pages.

Leviathan, et al. "Google Duplex: An AI System for Accomplishing Real-Worid Tasks Over the Phone" [https://ai.googleblog.com/2018/05/duplex-ai-system-for-natural-conversation.html], Google AI Blog, May 8, 2018, 7 pages.

Holley, Peter. "This app knows when you've been in an accident—and then it calls 911 for you". The Washington Post [https://www.washingtonpost.com/technology/2018/10/02/this-app-knows-when-youve-been-an-accident-then-it-calls-you/?noredirect=on]. Oct. 2, 2018. Retrieved Oct. 5, 2018. 3 pages.

Non-Final Office Action received for U.S. Appl. No. 16/171,067 dated Dec. 2, 2019, 36 pages.

Non-Final Office Action received for U.S. Appl. No. 16/129,267 dated Jan. 27, 2020, 28 pages.

Final Office Action received for U.S. Appl. No. 16/171,067 dated Jun. 12, 2020, 51 pages.

Notice of Allowance received for U.S. Appl. No. 16/129,267 dated Jun. 10, 2020, 24 pages.

Non-Final Office Action received for U.S. Appl. No. 16/221,418 dated Apr. 16, 2020, 44 pages.

Final Office Action received for U.S. Appl. No. 16/221,418 dated Jul. 29, 2020, 38 pages.

Non Final Office Action received for U.S. Appl. No. 16/221,418 dated Nov. 10, 2020, 40 pages.

Final Office Action received for U.S. Appl. No. 16/221,418 dated Mar. 8, 2021, 46 pages.

Non Final Office Action received for U.S. Appl. No. 16/171,067 dated Jul. 23, 2021, 56 pages.

Final Office Action received for U.S. Appl. No. 16/171,067 dated Jan. 20, 2022, 46 pages.

Non Final Office Action received for U.S. Appl. No. 17/017,210 dated Sep. 2, 2021, 51 pages.

* cited by examiner

TASK DELEGATION AND COOPERATION FOR AUTOMATED ASSISTANTS

RELATED APPLICATIONS

The subject patent application is a continuation of, and claims priority to each of, U.S. patent application Ser. No. 17/017,210, filed Sep. 10, 2020, and entitled "TASK DELEGATION AND COOPERATION FOR AUTOMATED ASSISTANTS," which is a continuation of U.S. patent application Ser. No. 16/129,267 (now U.S. Pat. No. 10,802,872), filed Sep. 12, 2018, and entitled "TASK DELEGATION AND COOPERATION FOR AUTOMATED ASSISTANTS," the entireties of which applications are hereby incorporated by reference herein.

TECHNICAL FIELD

The present disclosure relates generally to artificial intelligence, e.g., to task delegation and cooperation for automated assistants.

BACKGROUND

Automated digital assistants (also sometimes referred to as "bots") are software applications that run automated tasks, often over the Internet. The automated tasks are typically simple and structurally repetitive, and can be performed by the automated digital assistants at a much higher rate than would be possible for a human to perform.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
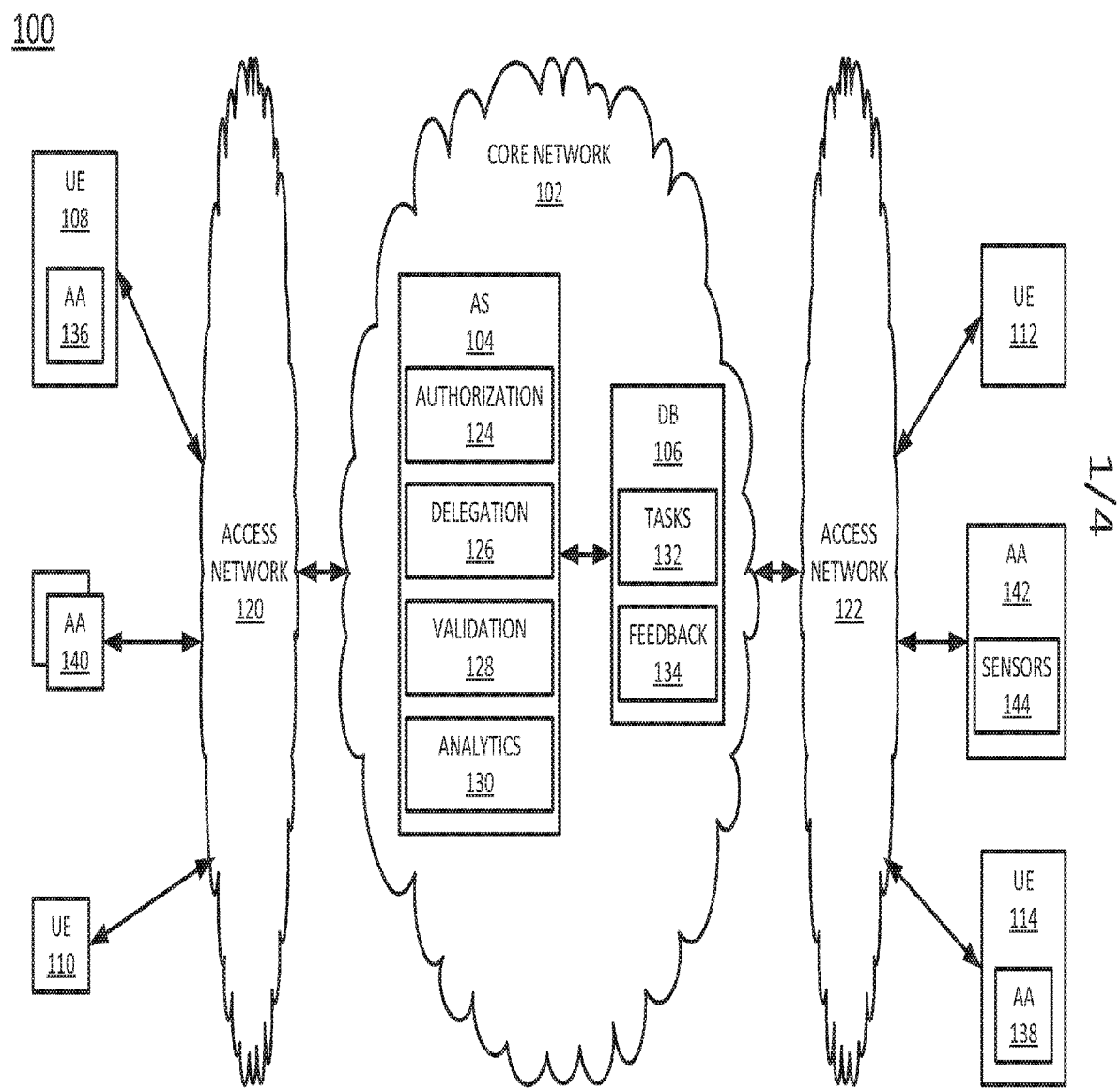
FIG. 1 illustrates an example network related to the present disclosure.

The present disclosure provides task delegation and cooperation for automated assistants. In one example, a method includes receiving, at a centralized support center that is in contact with a plurality of automated assistants including a first automated assistant and a second automated assistant, a request to perform a task on behalf of an individual, formulating, at the centralized support center, the task as a plurality of sub-tasks including a first sub-task and a second sub-task, delegating, at the centralized support center, the first sub-task to the first automated assistant, based on a determination at the centralized support center that the first automated assistant is capable of performing the first sub-task, and delegating, at the centralized support center, the second sub-task to the second automated assistant, based on a determination at the centralized support center that the second automated assistant is capable of performing the second sub-task.

In another example, a device includes a processor of a centralized support center and a computer-readable medium storing instructions which, when executed by the processor, cause the processor to perform operations. The operations include receiving, at the centralized support center that is in contact with a plurality of automated assistants including a first automated assistant and a second automated assistant, a request to perform a task on behalf of an individual, formulating, at the centralized support center, the task as a plurality of sub-tasks including a first sub-task and a second sub-task, delegating, at the centralized support center, the first sub-task to the first automated assistant, based on a determination at the centralized support center that the first automated assistant is capable of performing the first sub-task, and delegating, at the centralized support center, the second sub-task to the second automated assistant, based on a determination at the centralized support center that the second automated assistant is capable of performing the second sub-task.

In another example, a non-transitory computer-readable storage medium stores instructions which, when executed by a processor of a centralized support center, cause the processor to perform operations. The operations include receiving, at a centralized support center that is in contact with a plurality of automated assistants including a first automated assistant and a second automated assistant, a request to perform a task on behalf of an individual, formulating, at the centralized support center, the task as a plurality of sub-tasks including a first sub-task and a second sub-task, delegating, at the centralized support center, the first sub-task to the first automated assistant, based on a determination at the centralized support center that the first automated assistant is capable of performing the first sub-task, and delegating, at the centralized support center, the second sub-task to the second automated assistant, based on a determination at the centralized support center that the second automated assistant is capable of performing the second sub-task.

In one example, the present disclosure provides task delegation and cooperation for automated assistants. As discussed above, automated digital assistants are software applications that run automated tasks, often over the Internet. The automated tasks are typically simple and structurally repetitive, and can be performed by the automated assistants at a much higher rate than would be possible for a human to perform. However, conventional automated assistants lack the mechanisms for light, partial, and full automation with respect to tasks that may include variations from individual to individual. For instance, tasks such as answering a door, accepting a delivery, or installing electronic equipment, are common tasks that many individuals may require assistance with. However, there may be slight variations in terms of how those tasks are performed from individual to individual, owing, for instance, to variations in the individuals' environments. Moreover, if an individual does not have access to a particular sensor or Internet of Things (IoT) capability required for a given task to be performed by an automated assistant, there may be no way to authorize and authenticate an automated assistant provided by a service provider. As an example, a home delivery service may require admittance to and a specification of a location at which to deposit a new piece of furniture. The recipient of the furniture should be able to provide explicit visual instructions that can be subsequently validated by a camera system provided by the delivery service to ensure that the delivery is consistent with the recipient's instructions.

Examples of the present disclosure create a "marketplace" via which a plurality of automated assistants may cooperate by performing different sub-tasks that comprise parts of a larger task. This allows the larger task to be completed in an optimal manner by delegating different sub-tasks to the automated assistants that are best-suited to perform the sub-tasks. This also allows sub-tasks to be shared and reused in a trusted fashion among the automated assistants, providing for learning, and, ultimately, further automation of tasks.

To better understand the present disclosure, FIG. 1 illustrates an example network 100 related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G, 4G, 5G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, the core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may also further comprise an Internet Service Provider (ISP) network. In one example, the core network 102 may include an application server (AS) 104 and a database (DB) 106. Although a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (UEs) 108 and 110, while the access network 122 may be in communication with one or more UEs 112 and 114. In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In a further example, the user endpoint devices 108, 110, 112, and 114 may include smart home or IoT devices, such as smart doorbells, smart thermostats, smart lighting systems, smart locks, smart appliances, or the like. In addition, some of the UEs 108, 110, 112, and 114 may include sensors (e.g., imaging sensors, audio sensors, thermal sensors, pressure sensors, light sensors, smoke sensors, humidity sensors, motion sensors, and/or the like) for detecting and/or recording information about a surrounding environment. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one example, the endpoint devices 108 and 114 may have installed thereon an automated assistant (AA) 136 or 138, respectively. The AAs 136 and 138 may comprise software applications that are programmed to allow the respective UEs 108 and 114 to perform tasks or sub-tasks, potentially under the direction of an individual or the AS 104. As such, the AAs 136 and 138 may perform the methods discussed below in conjunction with FIG. 3, which relate to performing delegated tasks.

The access networks 120 and 122 may also be in communication with AAs 140 and 142, respectively, that are not installed on UEs. These AAs 140 and 142 may comprise, for instance, hardware devices such as robots, drones, or unmanned vehicles that are capable of performing tasks and sub-tasks under the direction of an individual or the AS 104 (e.g., the hardware devices can carry out the tasks or subtasks, possibly while meeting certain criteria such as time limits, cost restrictions, and/or the like). As such, the AAs 140 and 142 may perform the methods discussed below in conjunction with FIG. 3, which relate to performing delegated tasks.

In one example, the AAs 140 and 142 may have both cellular and non-cellular access capabilities and may further have wired communication and networking capabilities. In addition, some of the AAs 140 and 142 may include sensors 144 (e.g., imaging sensors, audio sensors, thermal sensors, pressure sensors, light sensors, smoke sensors, humidity sensors, motion sensors, and/or the like) for detecting and/or recording information about a surrounding environment.

The AAs 136, 138, 140, and 142 may communicate with each other as well as with the AS 104 (e.g., via digital application programming interfaces). The AAs 136, 138, 140, and 142 may also communicate with humans (e.g., via input/output devices such as a display, a speaker, a keyboard, a camera, a microphone, a haptic device, or the like). The AAs 136, 138, 140, and 142 may be owned and operated by individuals (e.g., the same individuals who own and operate the UEs 108, 110, 112, and 114) or by service providers who make the AAs 136, 138, 140, and 142 available for performing tasks on behalf of the individuals and/or service providers. It should be noted that although four AAs are illustrated in FIG. 1, any number of AAs may be deployed.

Figure 4:
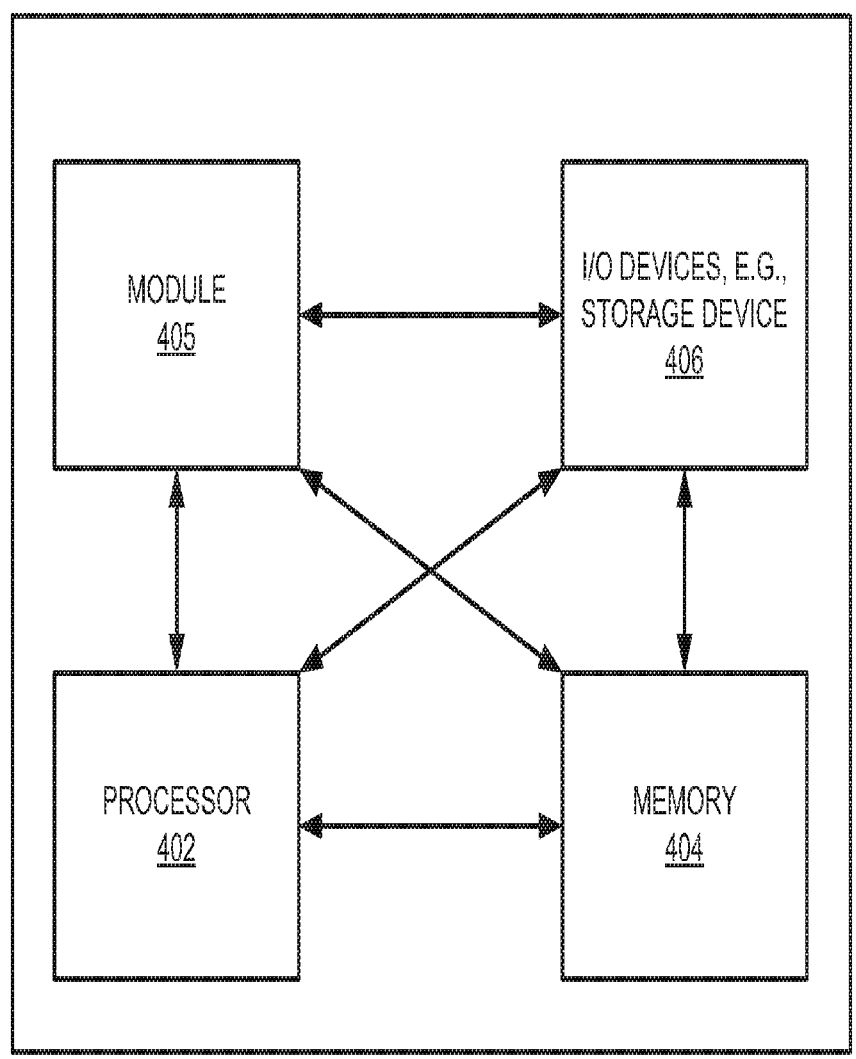
FIG. 4 depicts a high-level block diagram of a computing device specifically programmed to perform the functions described herein.

The AS 104 may comprise a computer specifically programmed to operate as a special purpose computer, as illustrated in FIG. 4 and discussed below. In one example, the AS 104 may perform the methods discussed below related to providing task delegation for automated assistants. For instance, in one example, the AS 104 hosts an application that receives requests for assistance from UEs operated by individuals and delegates the requests to automated assistants. In this way, the AS 104 may function as a centralized support center for orchestrating task performance. To this end, the AS 104 may include an authorization engine 124, a delegation engine 126, a validation engine 128, and/or an analytics engine 130.

In one example, authorization engine 124 may verify that particular AAs 136, 138, 140, and 142 are authorized to perform certain tasks. For instance, if a task to be performed requires information that can be provided via a sensor, but the individual on whose behalf the task is to be performed does not have access to the necessary sensor, the authorization engine 124 may verify that a sensor provided by a service provider associated with the task can be used to provide the information.

In one example, the delegation engine 126 may determine which of the AAs 136, 138, 140, and 142 are best suited to perform particular sub-tasks of a task to be performed. The delegation engine 126 may maintain a list or roster of available automated assistants (including AAs 136, 138, 140, and 142) and their respective capabilities, and may update this list from time to time (e.g., periodically according to a defined schedule, randomly, or in response to events such as automated assistants leaving or joining the network 100). The delegation engine 126 may communicate with the AAs 136, 138, 140, and 142 in order to maintain the roster and also to delegate sub-tasks.

The validation engine 128 may track the progress of a task being performed by AAs 136, 138, 140, and 142. In one example, the validation engine 128 may communicate with the AAs 136, 138, 140, and 142, for example to receive reports from the AAs 136, 138, 140, and 142 concerning the statuses of the sub-tasks the AAs 136, 138, 140, and 142 have been asked to perform. The validation engine 128 may also inform a first AA when a sub-task performed by a second AA, on which a sub-task to be performed by the first AA is dependent, has been successfully completed.

The analytics engine 130 may apply knowledge of individual preferences (learned, for example, through observation or explicit statement by the individual) to store information that assists in task performance. For instance, information regarding previously performed tasks may be stored to assist in the performance of similar tasks in the future. However, the analytics engine 130 may modify the stored information in order to better align to the preferences of a specific individual on whose behalf a task is currently being performed.

In one example, the DB 106 stores information relating to tasks that have been performed in the past by the automated assistants. To this end, the DB 106 may include a repository of tasks 132 and a repository of feedback 134. The repository of tasks 132 may include information about previously performed tasks. This information may include the nature of the task performed, the location at which the task was performed, the time at which the task was performed, and/or the individual on whose behalf the task was performed. The information may also include a plurality of sub-tasks into which the task may be divided. For instance, a task that involves arranging for repair of an appliance in an individual's home might include sub-tasks of determining the type of repair to be made, contacting a service provider who can perform the repair, scheduling an appointment with the service provider, and admitting the service provider to the individual's home to repair the appliance. Storage of the previously performed tasks and sub-tasks allows the tasks and sub-tasks to be re-used and shared in a trusted fashion, which streamlines automation. In other words, each individual on whose behalf a similar task is being performed will not necessarily have to provide detailed instructions for performing that task; if one individual provides instructions, those instructions may be re-used (potentially with modifications) for the other individuals.

The repository of feedback 134 may include feedback from individuals on whose behalf the tasks were performed. For instance, this feedback may indicate whether the tasks were completed to the individuals' satisfaction or whether the individuals suggested improvements for completing the tasks. The repository of feedback 134 may also include feedback from automated assistants. For instance, this feedback may indicate whether any problems were encountered in performing the tasks and/or what actions were taken to resolve the problems. In addition, the repository of feedback 134 may include information about individuals' preferences, for example in the forms of profiles, task histories, or the like.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional robots, endpoint devices, sensors, access networks, network elements, application servers, etc. without altering the scope of the present disclosure.

Figure 2:
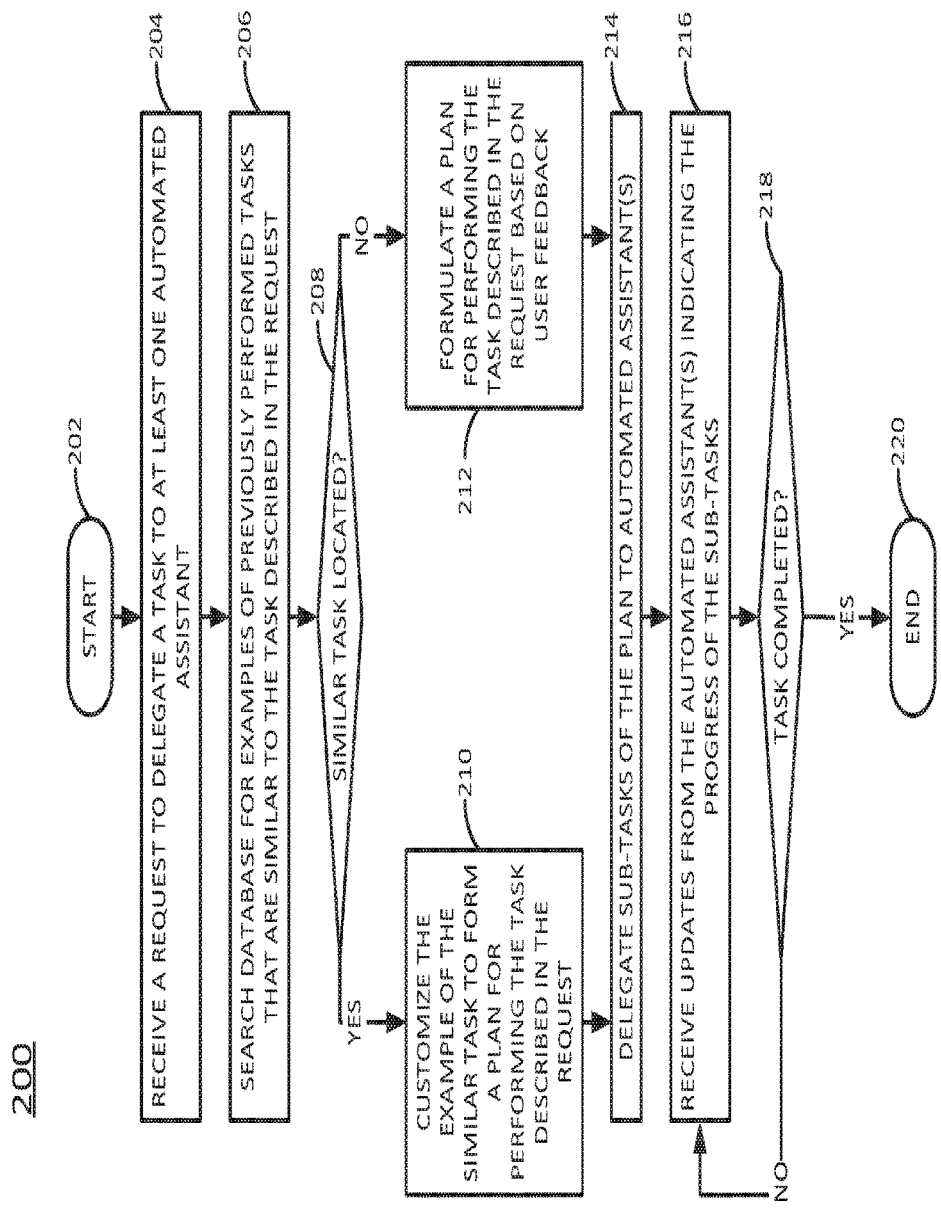
FIG. 2 illustrates a flowchart of an example method for providing task delegation for automated assistants.

To further aid in understanding the present disclosure, FIG. 2 illustrates a flowchart of an example method 200 for providing task delegation for automated assistants. In one example, the method 200 may be performed by an application server, e.g., AS 104 illustrated in FIG. 1. The application server may host a service through which an individual can delegate tasks to automated assistants. However, in other examples, the method 200 may be performed by another device. As such, any references in the discussion of the method 200 to components of the network illustrated in FIG. 1 are not intended to limit the means by which the method 200 may be performed.

The method 200 begins in step 202. In step 204, a request may be received to delegate a task to at least one automated assistant. The request may be received, for example, from a user endpoint device operated by an individual on whose behalf the task is to be performed. In one example, the request may include the following information: a task to be performed, a location (e.g., a room, boundaries of a physical space, etc.) at which the task is to be performed, a time at which the task is to be performed, and/or an individual on whose behalf the task is to be performed. The request may also include supplemental information or evidence to clarify the nature of the task. For instance, if the task involves scheduling a repair of an appliance at an individual's home, the supplemental information or evidence may include images of the appliance to be repaired and/or images showing how the appliance can be accessed by a technician. In this way, proper performance of the task may be verified (e.g., the technician can refer to the images to verify that he or she is accessing the correct appliance).

In step 206, a database, such as the DB 106 illustrated in FIG. 1, may be searched for examples of previously performed tasks that are similar to the task described in the request. For instance, where the task described in the request involves repair of an appliance at an individual's home, the database may include a record of a previously performed task that involved repair of a similar appliance in another individual's home. As discussed above, the record may include a sequence of sub-tasks that were performed in order to complete the previously performed task. The record of the previously performed task may thus be used as a template for performing the task described in the request.

In step 208, it is determined whether an example of a similar, previously performed task has been located in the database. If it is determined in step 208 that an example of a similar, previously performed task has been located, then the method 200 may proceed to step 210.

In step 210, the example of the similar, previously performed task may be customized or modified as necessary to satisfy the request. For instance, variations in the locations at which the present task and the previously performed task are performed, the times at which the present task and the previously performed task are performed, the individuals on whose behalf the present task and the previously performed task are performed, or other aspects of the tasks may dictate a modification to one or more of the sub-tasks. As an example, if the request received in step 204 related to a repair of a washing machine, while the previously performed task related to a repair of an air conditioning unit, then sub-tasks involving contacting service providers (e.g., washing machine repair services versus HVAC repair services) may be modified to ensure that appropriate service providers are consulted. In addition, the individual's preferences associated with task performance may be considered in this step. The individual's preferences may be stored, for example, in a profile, a request history, or a feedback history associated with the individual (and stored, e.g., in the DB 106).

If, on the other hand, it is determined in step 208 that an example of a similar, previously performed task has not been located, then the method 200 may proceed to step 212.

In step 212, a plan may be formulated for performing the task described in the request. As with the example of the similar, previously performed task, the plan may include a sequence of sub-tasks that can be performed in order to complete the task described in the request. The individual on whose behalf the task is to be performed may be consulted for feedback in this step. For instance, the individual may be asked to provide at least a basic sequence of sub-tasks. In addition, the individual's preferences associated with task performance may be considered in this step.

In step 214, each of the sub-tasks may be delegated to an automated assistant. In one example, the plan formulated in step 212 includes a plurality of sub-tasks, and the plurality of sub-tasks being delegated among a plurality of automated assistants. It should be noted, however, that this will not necessarily result in a one-to-one correspondence between sub-tasks and automated assistants. For instance, multiple sub-tasks could be delegated to a single automated assistant. In one example, approval from the individual on whose behalf the task is being performed may be sought before a sub-task is delegated to a particular automated assistant. This helps to ensure that performance of the task aligns to the individual's long-term goals.

In step 216, updates may be received from the automated assistant(s) to which the sub-tasks have been delegated. The updates may allow for the progress of the task to be tracked (e.g., to gauge how close to completion the task is). In one example, where the method 200 is performed by an application server, the application server may rely on the updates to time the sending of instructions to automated assistants. For instance, where a first sub-task cannot be performed until a second sub-task is completed, the application server may wait for confirmation that the second sub-task is completed before instructing an automated assistant to perform the first sub-task. The updates may also allow problems to be detected and addressed. For instance, if a given automated assistant reports that it is unable to complete a sub-task, the sub-task may be re-delegated to a different automated assistant. Alternatively, clarification may be solicited from the individual on whose behalf the task is being performed regarding information associated with the sub-task.

In step 218, it may be determined whether the task has been completed. If it is determined in step 218 that the task has been completed, then the method 200 may end in step 220. If, on the other hand, it is determined in step 218 that the task has not been completed, then the method 200 may return to step 216 and proceed as described above until the task is determined to be completed. In one example, upon completion of the task, information about the task (e.g., which automates assistants performed which sub-tasks, how the sub-tasks were performed, errors encountered, etc.) may be stored, e.g., in a database, for use in performing future tasks.

The method 200 therefore simplifies the performance of human tasks by providing predictive resolution of issues in an automated or semi-automated manner, potentially with some human interaction. Continuous learning from prior experiences and/or human feedback, as well as the ability to customize common tasks for specific individuals, allows tasks to be performed more quickly and more efficiently.

Figure 3:
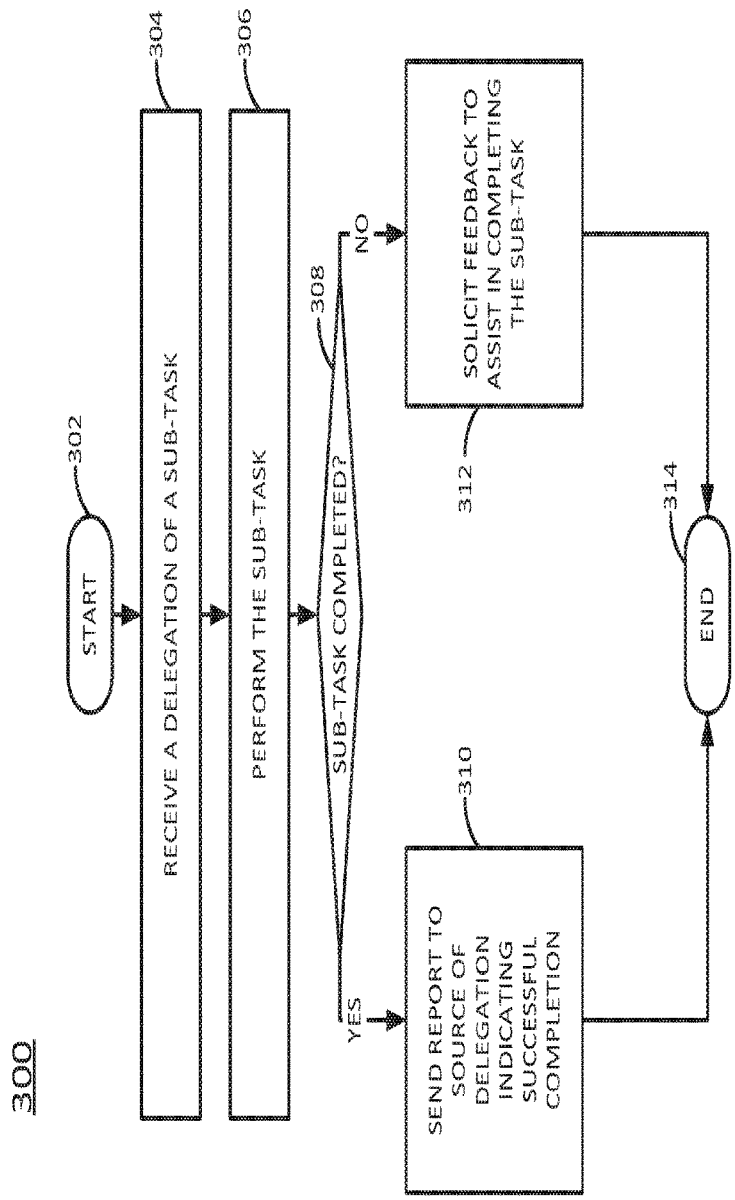
FIG. 3 illustrates a flowchart of an example method for providing task delegation for automated assistants.

FIG. 3 illustrates a flowchart of an example method 300 for providing task delegation for automated assistants. In one example, the method 300 may be performed by an automated assistant, e.g., any one of the AAs 136, 138, 140, or 142 illustrated in FIG. 1. However, in other examples, the method 300 may be performed by another device. As such, any references in the discussion of the method 300 to components of the network illustrated in FIG. 1 are not intended to limit the means by which the method 300 may be performed.

The method 300 begins in step 302. In step 304, a delegation of a sub-task may be received. The sub-task may comprise a component of a larger task that is to be performed on behalf of a requesting individual. For instance, if the larger task relates to repairing an appliance in the individual's home, the sub-task may comprise collecting information about the appliance (e.g., type of appliance, make, model, age, error codes, etc.), scheduling an appointment with a repair service, or unlocking a door to admit a technician into the individual's home. In a further example, the delegation of the sub-task may include instructions for performing the sub-task. For instance, information about a similar sub-task that was performed previously (e.g., by another automated assistant) could be provided as a template for performing the sub-task.

In step 306, the sub-task is performed. In one example, performing the sub-task may include modifying information or instructions that were provided to align with the needs of the requesting individual. For instance, information about a similar sub-task that was performed previously (e.g., repair of the same type of appliance in another individual's home) can be used as a template, as described above. However, modifications may be made to the template to customize it to the requesting individual's needs. As an example, if the sub-task involves scheduling an appointment for an appliance repair with a repair service, the repair service may need to know where in the individual's home the appliance is located. The appliance associated with the previously performed sub-task may have been located in the laundry room. However, in the instant case, the appliance may be located in the basement.

In step 308, it is determined whether the sub-task has been successfully completed. If it is determined that the sub-task has not been successfully completed, then the method 300 may proceed to step 310. In step 310, feedback may be solicited, for example from a centralized entity (e.g., an application server) or from a human (e.g., a technician or the individual on whose behalf the sub-task is to be performed). For instance, if an error is encountered in trying to perform the sub-task, suggestions for working around the error may be sought. Alternatively, if the nature of the sub-task is unclear or ambiguous, clarification may be sought from the individual on whose behalf the sub-task is to be performed. In such a case, interaction with the individual could take place through various modalities, including video chat, text messaging, or the like. The method 300 may then return to step 306, and another attempt may be made to perform the sub-task.

If, on the other hand, it is determined in step 308 that the sub-task has been successfully completed, then the method may proceed to step 312. In step 312, a report may be sent to the source of the delegation received in step 304. The report may indicate that the sub-task has been successfully completed, and may include additional information that may be useful to other automated assistants which may be performing subsequent sub-tasks related to the same larger task. For instance, if a first automated assistant is tasked with scheduling an appointment with a repair service, another automated assistant may be tasked with admitting the repair service to the requesting individual's home at the scheduled time.

The method may end in step 314.

Although examples of the disclosure are described within the context of an individual making an explicit request for performance of a task, it should be noted that in some cases, a request for performance of a task may come from an automated assistant, without explicit instruction from the individual. For instance, an automated assistant in an individual's home may detect the individual complaining about the picture quality while watching television. The automated assistant may communicate with probes on a set top box connected to the television in order to collect evidence of the picture quality. Subsequently, the automated assistant may communicate, overnight, with back-end services to diagnose and repair the picture quality issues. If the picture quality issues cannot be resolved in this manner, the automated assistant may ask the individual if he or she wishes to schedule an appointment with a technician. The automated assistant may subsequently submit a request, e.g., to an application server, and may cooperate with other automated assistants to facilitate repair of the picture quality issues by the technician. Alternatively, the automated assistant could solicit advice on resolving the picture quality issues from other automated assistants and/or an application server, and could present this advice to the individual for consideration.

Furthermore, the tasks delegated to the automated assistants need not necessarily be physical tasks. For instance, an individual may wish to improve his health through diet and exercise. Stored information about the individual may include his typical diet, known health conditions, family health history, and preferred dining locations. The automated assistant may gather further information from the individual's health care providers (e.g., doctors, pharmacists, insurance providers, etc.), family members, or the like. The automated assistant may then make suggestions when it detects that the individual is engaging in an activity that may affect his health. For example, if the automated assistant detects that he is in the bread aisle of the grocery store, the automated assistant may suggest purchasing a loaf of whole grain bread rather than a load of white bread. In another example, the automated assistant may detect that the individual is cooking and suggest healthier cooking methods (e.g., baking rather than frying), potentially working in conjunction with smart home appliances to carry out accepted suggestions. In another example still, the automated assistant may detect that the individual is ignoring suggestions to get more sleep, and could alternatively suggest that the individual take a vitamin supplement to make up for vitamins deficiencies caused by lack of sleep, perhaps after consulting with other automated assistants and/or with external data sources. Thus, an alternative sub-task could be suggested in place of a failed (or ignored) sub-task.

FIG. 4 depicts a high-level block diagram of a computing device specifically programmed to perform the functions described herein. For example, any one or more components or devices illustrated in FIG. 1 or described in connection with the methods 300 or 300 may be implemented as the system 400. For instance, an automated assistant or an application server could be implemented as illustrated in FIG. 4.

As depicted in FIG. 4, the system 400 comprises a hardware processor element 402, a memory 404, a module 405 for providing task delegation and cooperation for automated assistants, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing task delegation and cooperation for automated assistants may include circuitry and/or logic for performing special purpose functions relating to planning and/or performing tasks on behalf of an individual. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing task delegation and cooperation for automated assistants (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing task delegation and cooperation for automated assistants (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method, comprising:
   detecting, by a third automated assistant device of a system comprising a processor, a problem associated with a user identity, based on monitoring activity associated with the user identity, wherein a group of automated assistant devices comprises a first automated assistant device, a second automated assistant device, and the third automated assistant device;
   in response to detecting the problem, initiating, by the third automated assistant device of the system, a request to perform a task to resolve the problem, without user input associated with the user identity to instruct that the request be initiated;
   to facilitate resolving the problem, determining, by the system, the task, comprising a first sub-task and a second sub-task, to be performed based on the problem and sensor information that is related to the problem and received from a sensor;
   delegating, by the system, the first sub-task to the first automated assistant device, based on a first determination that the first automated assistant device is capable of performing the first sub-task; and
   delegating, by the system, the second sub-task to the second automated assistant device, based on a second determination that the second automated assistant device is capable of performing the second sub-task.

2. The method of claim 1, wherein the first determination comprises determining that the first automated assistant device is capable of performing the first sub-task based on first capability information that indicates a first capability of the first automated assistant device to perform the first sub-task, and
   wherein the second determination comprises determining that the second automated assistant device is capable of performing the second sub-task based on second capability information that indicates a second capability of the second automated assistant device to perform the second sub-task.

3. The method of claim 1, further comprising:
   in response to delegating the first sub-task to the first automated assistant device, instructing, by the system, the first automated assistant device to perform the first sub-task; and
   in response to delegating the second sub-task to the second automated assistant device, instructing, by the system, the second automated assistant device to perform the second sub-task.

4. The method of claim 1, further comprising:
   determining, by the system, that the task is to be divided into the first sub-task and the second sub-task based on an analysis of information relating to the task, wherein the request comprises a portion of the information relating to the task.

5. The method of claim 1, further comprising:
   determining, by the system, a difference between a previous sub-task and the first sub-task, based on information relating to the task and previous task information relating to performance of the previous sub-task, wherein the previous sub-task is determined to be similar to the first sub-task, in accordance with a defined similarity criterion, and wherein the previous task information is utilized as a template to facilitate determining the first sub-task;

determining, by the system, a modification to the template, based on the difference between the previous sub-task and the first sub-task; and modifying, by the system, the template, based on the modification, to generate first task information relating to the first sub-task usable to facilitate performance of the first sub-task.

6. The method of claim 5, further comprising:
retrieving, by the system, from a database device, the previous task information relating to the performance of the previous sub-task;
based on determining that the previous sub-task is similar to the first sub-task, utilizing, by the system, the previous task information as the template; and
determining, by the system, the first sub-task based on the modification to the template.

7. The method of claim 5, further comprising:
receiving, by the system, feedback information regarding the template before or after the template is modified, wherein the determining of the modification comprises determining the modification to the template based on the feedback information.

8. The method of claim 5, wherein the modifying comprises adapting the template in accordance with a preference associated with the user identity.

9. The method of claim 1, further comprising:
analyzing, by the system, request information of the request, wherein the request information comprises information indicating the task to be performed, the sensor information relating to the problem, location information indicating a location at which at least a portion of the task is to be performed, a time at which the portion of the task is to be performed, or a visual image relating to the task to be performed, and wherein the determining of the task comprises:
based on a result of the analyzing:
determining that the task to be performed;
determining that the task is to be divided into the first sub-task and the second sub-task;
determining that the first sub-task is to be delegated to the first automated assistant device; or
determining that the second sub-task is to be delegated to the second automated assistant device.

10. The method of claim 1, further comprising:
tracking, by the system, first progress of the first sub-task based on first report information relating to the first progress and received from the first automated assistant device;
tracking, by the system, second progress of the second sub-task based on second report information relating to the second progress and received from the second automated assistant device; and
determining, by the system, the first progress of the first sub-task and the second progress of the second sub-task based on the first report information and the second report information.

11. A system, comprising:
a processor; and
a memory that stores executable instructions that, when executed by the processor, facilitate performance of operations, comprising:
detecting, by a third automated assistant device, an issue associated with a user identity, based on perceiving activity associated with the user identity, wherein a group of automated assistant devices comprises a first automated assistant device, a second automated assistant device, and the third automated assistant device;
in response to detecting the issue, generating, by the third automated assistant device, a request to perform a task to resolve the issue, without user input associated with the user identity to instruct that the request be generated;
to facilitate resolving the issue, determining the task, comprising a first sub-task and a second sub-task, to be performed based on the issue and sensor information that is related to the issue and obtained from a sensor; and
delegating the first sub-task to the first automated assistant device and the second sub-task to the second automated assistant device.

12. The system of claim 11, wherein the operations further comprise:
determining that the first automated assistant device is capable of performing the first sub-task based on first capability data that indicates the first automated assistant device comprises a first capability to perform the first sub-task;
determining that the second automated assistant device is capable of performing the second sub-task based on second capability data that indicates the second automated assistant device comprises a second capability to perform the second sub-task,
wherein the delegating comprises:
delegating the first sub-task to the first automated assistant device, based on the first automated assistant device being determined to be capable of performing the first sub-task; and
delegating the second sub-task to the second automated assistant device, based on the second automated assistant device being determined to be capable of performing the second sub-task.

13. The system of claim 11, wherein the operations further comprise:
based on an analysis of information relating to the issue, the sensor information, or user input information associated with the user identity, formulating a plan for performing a group of sub-tasks of the task, wherein the group of sub-tasks comprises the first sub-task and the second sub-task, and wherein the plan comprises a sequence of sub-tasks, of the group of sub-tasks, that are to be performed in accordance with an order.

14. The system of claim 11, wherein the operations further comprise:
receiving update data from the first automated assistant device, wherein the update data indicates a progress of performance of the first sub-task; and
performing a subsequent action, in response to the update data.

15. The system of claim 14, wherein the performing of the subsequent action comprises:
instructing the second automated assistant device to perform the second sub-task, wherein the second sub-task is dependent on completion of the first sub-task and the update data indicates that the first sub-task is completed.

16. The system of claim 14, wherein the performing the subsequent action comprises:
based on the update data, determining that the first automated assistant device is unable to complete the first sub-task; and in response to determining that the first automated assistant device is unable to complete the first sub-task, at least one of:
- re-delegating the first sub-task to the second automated assistant device or a third automated assistant device to have the second automated assistant device or the third automated assistant device perform the first sub-task,
- soliciting, from an individual entity associated with the task, clarification regarding information relating to the first sub-task, or
- determining an alternative sub-task to be performed by the first automated assistant device in place of the first sub-task.

17. The system of claim 11, wherein the operations further comprise:
in response to determining that the task has been completed, storing information relating to the task or task completion information relating to completion of the task in a data store.

18. The system of claim 11, wherein the first sub-task comprises the first automated assistant device interacting with a device, and wherein the device is or comprises a computer, a Wi-Fi device, a personal digital assistant, a mobile phone, a smartphone, an email device, a computing tablet, a messaging device, a wearable device, a watch, a fitness tracker, a sensor, an Internet of Things device, a media device, an electronic gaming device, a set top box, a television, a doorbell, a thermostat, a lighting device, a lock device, or an appliance.

19. A non-transitory machine-readable medium, comprising executable instructions that, when executed by a processor, facilitate performance of operations, the operations comprising:
determining, by a third automated assistant device, that there is a problem associated with a user identity, based on monitoring activity associated with the user identity, wherein a group of automated assistant devices comprises a first automated assistant device, a second automated assistant device, and the third automated assistant device;
in response to determining that there is the problem, initiating, by the third automated assistant device, a request to perform a task to resolve the problem, without user input associated with the user identity to direct that the request be initiated;
to facilitate remedying the problem, determining the task, comprising a first sub-task and a second sub-task, to be performed based on the problem and sensor information that is related to the problem and received from a sensor; and
delegating the first sub-task to the first automated assistant device and the second sub-task to the second automated assistant device.

20. The non-transitory machine-readable medium of claim 19, wherein the operations further comprise:
determining that the first automated assistant device is capable of performing the first sub-task based on first capability data that indicates the first automated assistant device comprises a first capability to perform the first sub-task;
determining that the second automated assistant device is capable of performing the second sub-task based on second capability data that indicates the second automated assistant device comprises a second capability to perform the second sub-task,
wherein the delegating comprises:
- delegating the first sub-task to the first automated assistant device, based on the first automated assistant device being determined to be capable of performing the first sub-task; and
- delegating the second sub-task to the second automated assistant device, based on the second automated assistant device being determined to be capable of performing the second sub-task.

* * * * *